L. SCHWITZER.
BEARING CONSTRUCTION FOR FANS.
APPLICATION FILED AUG. 11, 1919.
1,423,265.
Patented July 18, 1922.
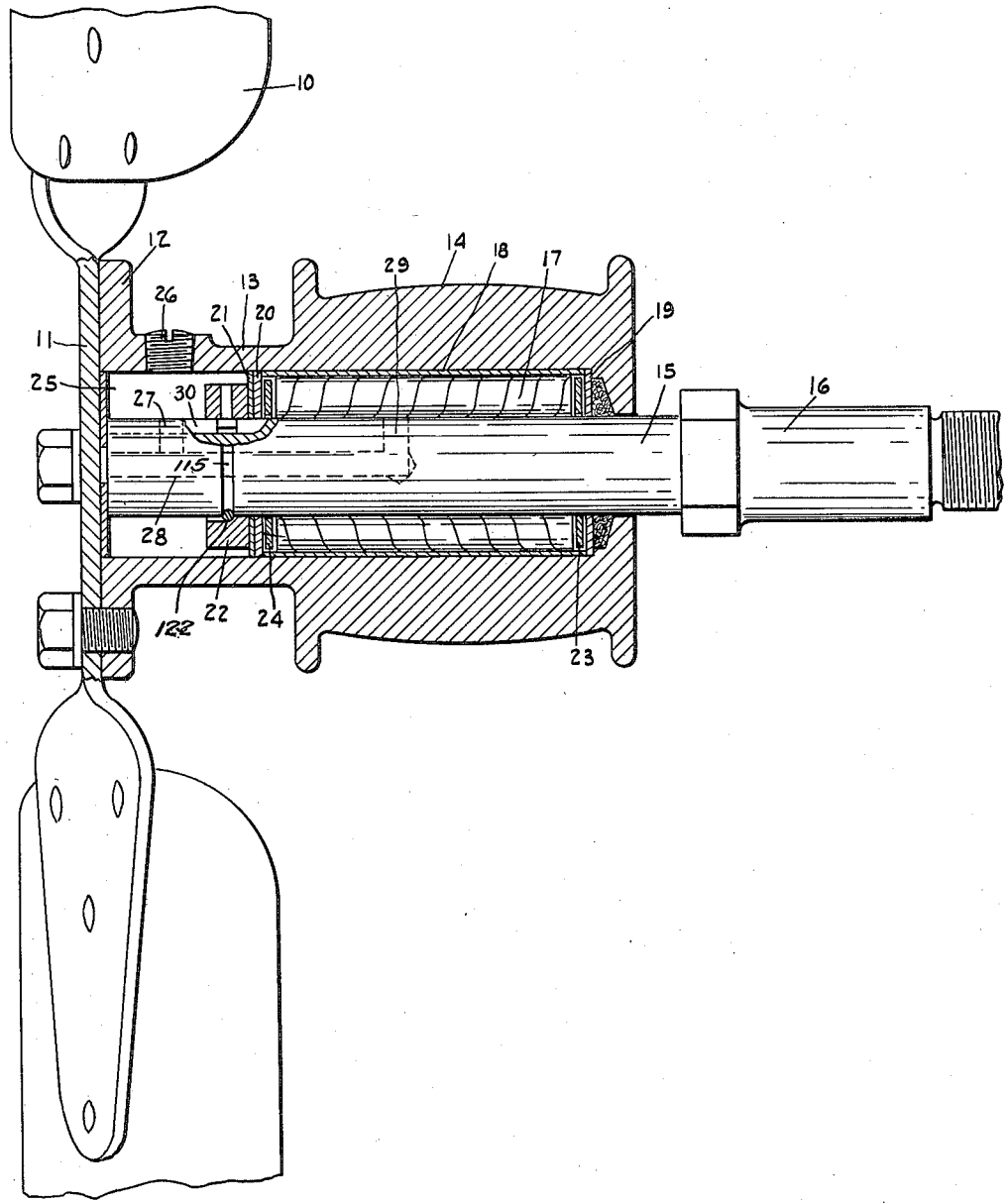
INVENTOR.
LOUIS SCHWITZER.
BY
ATTORNEYS.

UNITED STATES PATENT OFFICE.

LOUIS SCHWITZER, OF INDIANAPOLIS, INDIANA, ASSIGNOR TO AUTOMOTIVE PARTS COMPANY, OF INDIANAPOLIS, INDIANA, A CORPORATION.

BEARING CONSTRUCTION FOR FANS.

1,423,265.   Specification of Letters Patent.   Patented July 18, 1922.

Application filed August 11, 1919. Serial No. 316,855.

*To all whom it may concern:*

Be it known that I, LOUIS SCHWITZER, a citizen of the Republic of Czecho-Slovakia, having declared my intention of becoming a citizen of the United States, and a resident of Indianapolis, county of Marion, and State of Indiana, have invented a certain new and useful Bearing Construction for Fans; and I do hereby declare that the following is a full, clear, and exact description thereof, reference being had to the accompanying drawings, in which like numerals refer to like parts.

This invention relates to the lubricating system for fans, and especially that type of fans having a long hub in which roller bearings are mounted.

In using roller bearings in a motor driven fan construction, no satisfactory continuous lubrication has been provided. This has caused difficulty to be experienced with this type of bearing, because of the neglect in replenishing the lubricant. It is, therefore, the object of this invention to provide an efficient lubricating system, whereby the roller bearings contained within the fan hub will receive proper lubrication for a long period of time. This is accomplished by providing a suitable oil reservoir within the fan hub with an oil conduit in the stationary spindle leading to the bearings, as will be hereinafter more fully shown and described.

In the accompanying drawings which are made a part of this application, the figure shown is a central vertical cross section through the fan construction showing the roller bearings in elevation.

In the drawings there is shown a fan 10 mounted on the fan plate 11 which is secured to the flanges 12 of the fan hub 13 on which there is a pulley 14. The hub 13 is mounted on a stationary spindle 15 which is secured to the fan support 16. Within the fan hub there are a plurality of bearing rollers 17 mounted in the bearing sleeve 18 which abuts against the thrust washers 20 and 21 and collar 22, which is held in position by the wire locking ring 122 seated in the annular groove 115 surrounding the spindle 15 near the outer end thereof. The ends of the roller bearings 17 are provided with the usual retaining rings 23 and 24.

Near the outer end of the hub 13 there is provided by the foregoing construction an oil reservoir 25 into which a relatively large quantity of lubricating oil may be poured through the opening closed by the filling plug 26. In communication with the oil reservoir there is a passage 27 in the spindle 15 which opens into a longitudinally extending oil passage 28 which extends rearwardly through the center of the spindle to well within the roller bearings, and by which the oil contained in the reservoir may be fed to the bearing surface of the spindle. There is also an oil passageway 30 extending longitudinally through said spindle from the reservoir to the end thrust bearing 20 and into the roller bearing for facilitating the lubrication thereof. As very little oil is consumed in the operation of the fan, the oil reservoir need only be filled once in a long period of time, as it will retain in one filling sufficient oil to keep the bearings well supplied without the necessity of constantly oiling the bearings, or permitting them to go dry.

The invention claimed is:

A fan construction having a stationary spindle, a hub mounted on said spindle and adapted to rotate thereon, a fan plate secured to the outer end of said hub, roller bearings mounted between said spindle and hub, an oil reservoir within said hub between the outer end of said bearings and the fan plate, end thrust bearings mounted at the outer end of said roller bearings, a longitudinally extending oil conduit passing through said spindle, a radially extending passage in said spindle communicating with said longitudinal passage and oil reservoir for maintaining the lubrication of said bearings, and a second oil passageway in said spindle communicating with said reservoir and end thrust bearings for maintaining their lubrication.

In witness whereof, I have hereunto affixed my signature.

LOUIS SCHWITZER.